Feb. 9, 1926.
G. E. GODDARD
WINDSHIELD
Filed June 27, 1921
1,571,941
2 Sheets-Sheet 2
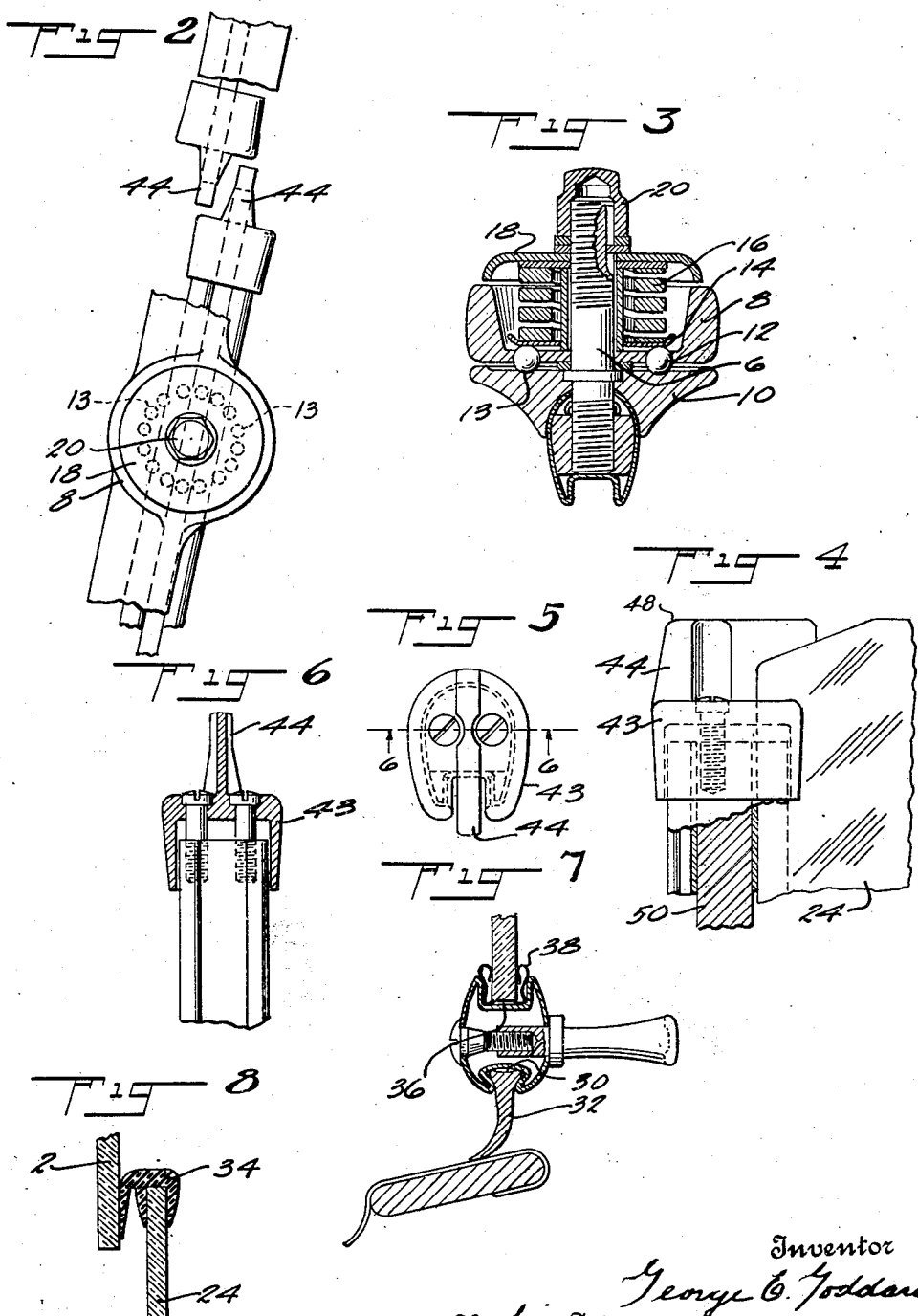

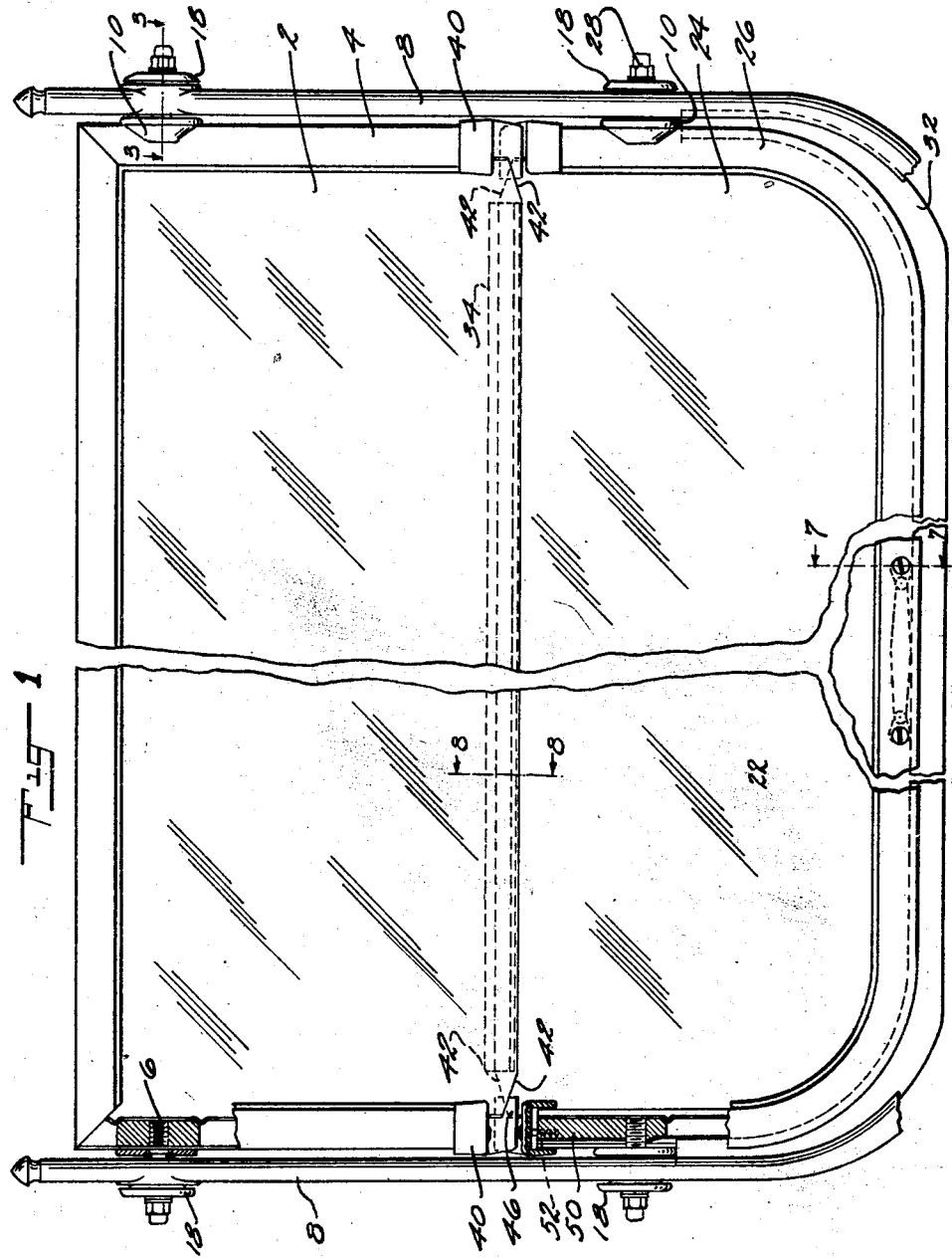

Patented Feb. 9, 1926.

1,571,941

UNITED STATES PATENT OFFICE.

GEORGE E. GODDARD, OF DETROIT, MICHIGAN, ASSIGNOR, BY MESNE ASSIGNMENTS, TO DODGE BROTHERS, INC., A CORPORATION OF MARYLAND.

WINDSHIELD.

Application filed June 27, 1921. Serial No. 480,589.

*To all whom it may concern:*

Be it known that I, GEORGE E. GODDARD, a citizen of the United States, residing at Detroit, Michigan, have invented certain new and useful Improvements in Windshields, of which the following is a clear, full, and exact description.

This invention relates to windshields for automobiles, and more particularly to a construction for holding a glass within a windshield frame.

In the usual windshield construction, the glass is inserted in a groove in the windshield frame and is held therein by a cap attached to the frame and extending over the free edge of the glass. Notches are ordinarily ground in the edge of the glass at the corners thereof to receive that part of the cap which overlaps the edge of the glass, this construction allowing the outer edge or surface of the cap to lie flush with the edge of the glass. The making of these notches requires considerable labor and time and is, therefore, expensive and the glass is frequently broken in grinding in the notches.

One of the principal objects of the present invention is to produce a novel and improved construction for holding the glass in the frame of a windshield which will obviate the formation of notches in the edge of the glass and which will hold the glass securely in place and at the same time present a neat and attractive appearance.

With this object in view, the invention comprises the novel and improved features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings—

Fig. 1 is a view in front elevation partly broken away and partly in section of a windshield embodying the present invention;

Fig. 2 is a view in side elevation of a portion of the windshield;

Fig. 3 is a sectional view taken substantially on the line 3—3 of Fig. 1;

Fig. 4 is a view in side elevation partly in section illustrating particularly a cap for holding the glass in the windshield frame;

Fig. 5 is a view of the cap taken from above Fig. 4;

Fig. 6 is a detail view partly in elevation and partly in section on the line 6—6 of Fig. 5;

Fig. 7 is a sectional view taken substantially on the line 7—7 of Fig. 1; and

Fig. 8 is a sectional view taken substantially on the line 8—8 of Fig. 1.

The windshield embodying the invention in its preferred form as illustrated in the drawing comprises upper and lower sections each pivotally mounted upon uprights secured to the automobile body to swing upon horizontal pivots or trunnions. In the construction shown, the upper section of the windshield is indicated as a whole at 1 and comprises a section of plate glass 2 mounted in a frame, indicated at 4, extending about three sides of the glass and leaving the lower edge thereof exposed. The upper section of the windshield is pivoted by means of pivot studs 6 upon uprights 8 secured at their lower ends to the automobile body. To hold the windshield section in any position into which it is moved, a retaining device is interposed between the uprights 8 and the frame 4 of the windshield section. In the construction shown, a plate or block 10 is secured to the frame of the windshield by the pivot stud 6 which is passed through an opening in the block and threaded into the frame, the block having a groove to receive the frame so that it is prevented from turning with relation to the frame. Each pivot stud 6 passes through an opening in the corresponding upright 8 which is enlarged at the point at which the pivot stud passes through and the upright is provided with a series of openings in which are mounted balls 12 arranged to engage respectively in circular recesses in the block 10. A plate 14 is pressed against the balls 12 by means of a spring 16 interposed between said plate and a plate 18 held by a nut 20 on the outer end of the pivot stud, this spring normally holding the balls 12 in the recesses 13.

The lower section of the windshield indicated as a whole at 22 comprises a glass 24 mounted in a frame 26 extending about three sides of the glass and pivoted by means of pivot studs 28 on the uprights 8. A retaining device having the same construction and mode of operation as the retaining device above described is interposed between the studs 28 and the uprights 8.

The frame of the lower section of the windshield is provided with a groove 30 in which is mounted a rubber flap 32 extending along the lower edge of said section and part way up the sides thereof to prevent water from leaking through between the body or between the uprights and the lower windshield section. The glass 2 of the upper section, and the glass 24 of the lower section are constructed and arranged so that the exposed or free margins thereof overlap when the two sections are closed, as shown in Figs. 1 and 2. To prevent water from driving through between the two sections, a rubber cap 34 is mounted on the upper edge of the glass 24, this cap having a flap for engagement with the lower margin of the glass 2, as shown in Fig. 8.

The frames 4 and 26 of the two windshield sections, which are preferably made of hollow steel tubing, are each formed with a groove 36 to receive the margin of the glass and a resilient cushion 38 preferably made of thin spring steel plate bent into the proper shape is interposed between the margin of the glass and frame to form a non-rattling joint.

In the form of the invention illustrated in the drawing, each of the windshield glasses is held in the corresponding frame by means of caps 40 secured to the side members of the frame, all of these caps having the same construction. Each of the windshield glasses at the ends of the free edge thereof is bevelled off at an angle to this edge, as indicated at 42. Each of the caps 40 is provided with a hollow body portion 43 shaped to fit over the end of the side member of the windshield frame and with a fin 44 preferably having substantially the same thickness as the glass of the windshield. The fin 44 of the cap is provided with a lateral projection 46 arranged to engage the bevel 42 on the free edge of the glass at the end thereof, this projection preferably having its inner surface bevelled to correspond with the bevel on the glass. The edge 48 of the fin 44 at the end of the fin may be, and preferably is, so formed and arranged that it lies substantially flush or in line with the free edge of the glass.

The cap may be secured to the windshield frame in any suitable manner. In the preferred construction, however, a plug 50 is driven into the frame of the windshield and the cap is secured to the frame by means of screws 52 passing through the body portion of the cap and threaded into said plug.

The cap above described will hold the glass securely in the windshield frame and presents a very ornamental and attractive appearance. The bevels 42 can be ground comparatively cheaply and there is practically no danger of cracking the glass in the grinding of these bevels. The construction of the caps allows the two sections of the windshield to lie closely together at their overlapping edges, the fins 44 on the caps on the upper and lower sections overlapping when the windshield is closed, as clearly shown in Fig. 2.

It will be noted that the groove 30 is formed by inward bends in the wall of the tubing of which the windshield frame is formed, and that the inner portion of the groove is wider than the outer portion thereof. The flap 32 is provided with an enlarged marginal portion fitting in this groove. This is a cheap and efficient construction and enables the flap to be readily mounted on the frame and securely held thereon.

It is to be understood that except as defined in the claims, the invention is not limited to the particular construction and arrangement of parts of the illustrated embodiment of the invention, but that the invention may be embodied in other forms within the scope of the claims.

Having explained the nature and object of the invention, and having specifically described a construction embodying the invention in its preferred form, what is claimed is—

1. A windshield for automobiles having, in combination, a frame having three sides, a glass mounted in the frame and having the corners at the ends of the free edge of the glass bevelled off at an angle to said edge, and a cap secured to the frame and having an inwardly extending projection engaging one of the bevels on the glass and having its edge at the end thereof in line with said edge of the glass.

2. A windshield for automobiles having, in combination, a frame having three sides, a glass mounted in the frame and having its corners at the ends of its free edge bevelled off at an angle to said edge, a cap secured to the frame and having an inwardly extending projection formed with a bevelled surface and arranged to engage one of the bevels on the glass and having its edge at the end thereof in line with said edge of the glass.

3. A windshield having, in combination, a frame having three sides, a glass mounted in the frame, a cap having a body portion formed to embrace the end of one of the side members of the frame and a narrow fin of substantially the thickness of the glass extending from said body portion in the direction of the length of said side member of the frame, a projection on said fin of substantially the same thickness arranged to engage the free edge only of the glass to hold the glass in place in the frame, the fin and projection thereon leaving the faces of the glass exposed adjacent thereto and means for securing the cap to the side member of the frame.

4. A windshield for automobiles having, in combination, a frame having three sides, a glass mounted in the frame and having its corners at the ends of its free edge beveled off at an angle to said edge, a cap having a body portion formed to embrace the end of one of the side members of the frame, and a narrow fin, an inwardly extending projection on said fin engaging one of said bevels on the glass to hold the glass in place, the fin having its edge at the end thereof substantially in line with said edge of the glass.

5. A windshield for automobiles having, in combination, a frame having three sides, a glass mounted in the frame and having the corners at the ends of the free edge thereof beveled off, at an angle to said edge, a cap secured to the frame and having a fin of substantially the thickness of the glass arranged to engage one of the bevels on the glass to hold the glass in place and formed with an edge at the end thereof substantially in line with said edge of the glass.

6. A windshield having in combination a frame of three sides, a glass mounted in the frame, caps secured to the frame ends and having fins of substantially the same thickness as the glass and extending the full width of the frame end, said fins being provided with lateral projections of corresponding thickness to engage the free edge of the glass and having faces flush with the lateral face of the glass, said projections serving to hold the glass in place on the frame.

Signed at Detroit, Michigan, this 21st day of June, 1921.

GEORGE E. GODDARD.